United States Patent Office 2,743,303
Patented Apr. 24, 1956

2,743,303

PROCESS FOR THE PREPARATION OF 1,1,4,4-TETRAFLUOROBUTADIENE 1,3 FROM ACETYLENE AND TETRAFLUOROETHYLENE

John Lynde Anderson, Northwood, Del., assignor to E. I. du Pont de Nemours and Company, Wilmington, Del., a corporation of Delaware No Drawing. Application April 1, 1955, Serial No. 498,778

5 Claims. (Cl. 260—653)

This invention relates to a new method for preparing 1,1,4,4-tetrafluoro-1,3-butadiene.

1,1,4,4-tetrafluoro-1,3-butadiene is capable of being polymerized to high molecular weight addition polymers that are useful in the form of fibers, films and the like, and is also capable of forming dimers, trimers and higher thermal polymers that are useful as chemical intermediates. This particular fluorinated diene has recently been made by the pyrolysis of 3,3,4,4-tetrafluorocyclobutene at temperatures of 350° C. to 900° C. (U. S. application Serial No. 483,168, filed January 20, 1955, by J. L. Anderson and K. L. Berry).

This invention has as an object a new process. Other objects will appear hereinafter.

The process of the present invention is a one-step process wherein the readily available reactants, acetylene and tetrafluoroethylene, are reacted at a temperature between 350° C. and 900° C., and 1,1,4,4-tetrafluoro-1,3-butadiene is isolated.

The process of this invention is conveniently carried out by passing a mixture of acetylene and tetrafluoroethylene through a reaction zone heated to the desired temperature. The reactants can be used in widely different proportions, mixtures of acetylene and tetrafluoroethylene ranging from 10:1 to 1:10 (by volume) being operable. It is preferable, however, to use an excess of acetylene since, with an excess of tetrafluoroethylene, there is a greater tendency of the tetrafluoroethylene to dimerize to octafluorocyclobutane.

The reactor can be constructed of any inert heat-resistant material. For example, the reactor can be made of quartz, heat-resistant glass, stainless steel, and other inert metals. The reactor can, if desired, be packed with inert materials, e. g., granular quartz, to provide better heat transfer. Metals which react with the acetylene and tetrafluoroethylene under the operating conditions to give undesirable by-products should not be used. The reaction zone can be heated by conventional heating means, for example, by electric of gas-fired heaters.

While any temperature from 350° C. to 900° C. can be used to effect the reaction of this invention, it is preferred to use a temperature between 550° C. and 700° C. At lower temperatures, i. e., 300° C.–550° C., lower conversions of the reactants to the desired tetrafluorobutadiene are obtained, and at temperatures above 700° C. there is a greater tendency for side reactions to take place.

The pressure at which the acetylene and tetrafluoroethylene are reacted is not critical, pressures ranging from a few millimeters of mercury to superatmospheric being operable. Atmospheric pressure is very suitable, and this permits the use of less expensive reaction vessels.

The rate at which the acetylene and tetrafluoroethylene mixture is passed through the reaction zone is not critical. Contact times of the reaction gases at the reaction temperature can vary from one second or less up to several minutes. Very good results are obtained with contact times of less than one minute. For economic reasons, the preferred contact times are as short as possible. Contact times of one to thirty seconds at the preferred operating temperatures of 550° C.–700° C. give good results.

Nitrogen or other inert gas can be used as a diluent with the acetylene and tetrafluoroethylene in the process of this invention. However, the use of a diluent is not essential, and the process can be carried out with good results in the absence of any diluent.

The exit gases from the reaction zone are preferably cooled rapidly to avoid side reactions. This cooling is accomplished conveniently by passing the exit gases directly into a receiver cooled by a mixture of acetone and solid carbon dioxide or by liquid nitrogen.

The 1,1,4,4-tetrafluoro-1,3-butadiene produced by the process of this invention is separated from excess reactants and by-products by conventional means, for example, by fractional distillation. Unreacted acetylene and tetrafluoroethylene can be recycled if desired.

The following examples in which parts are by weight are illustrative of the invention.

*Example I*

A mixture of 5 liters of tetrafluoroethylene and 5 liters of acetylene is passed through a cylindrical quartz tube one inch in diameter and twelve inches long filled with quartz packing and heated by an electric heater at 600° C. The gas mixture, at one atmosphere pressure, is passed through the reaction zone during thirty minutes directly to a cold trap cooled by an acetone/solid carbon dioxide mixture. There is obtained in the cold trap 10 g. of liquid having a boiling point greater than 0° C. This liquid product consists chiefly of tetrafluoro-1,3-butadiene together with a small amount of octafluorocyclobutane. The diene is identified by its infrared absorption spectrum.

*Example II*

A mixture of 80 liters of acetylene and 40 liters of tetrafluoroethylene at one atmosphere is passed through a reaction tube of the type described in Example I heated at 600° C. during a period of four hours and directly to a cold trap as in Example I. Distillation of the reaction product collected in the cold trap gives 22 g. of 1,1,4,4-tetrafluoro-1,3-butadiene boiling at 4° C.–5° C., and having the correct infrared absorption spectrum. This amount corresponds to a yield of 10% based on the tetrafluoroethylene employed. There is also obtained approximately 22 g. of octafluorocyclobutane, produced by dimerization of the tetrafluoroethylene.

The process of this invention has the advantage, over the hitherto known methods, of making 1,1,4,4-tetrafluoro-1,3-butadiene by a single step from readily available raw materials.

The 1,1,4,4-tetrafluoro-1,3-butadiene is useful for a wide variety of purposes as described in the aforementioned U. S. application Serial No. 483,168 by J. L. Anderson and K. L. Berry. It is particularly useful for self-condensation to dimers, trimers, and higher thermal polymers and for addition polymerization to high molecular weight polymers useful for the manufacture of films and fibers. It is also useful as a chemical intermediate. For example, it can be halongenated to the corresponding saturated 1,1,4,4-tetrafluorohalobutanes and hydrogenated to 1,1,4,4 - tetrafluorobutane. 1,1,4,4 - tetrafluoro-1,3-butadiene can also be reacted with an equimolar amount of sodium ethoxide in ethanol at 90° C., then treated with water to form good yields of diethyl succinate. This ester is useful as a plasticizer, and for further reaction with glycols to form polyesters.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of 1,1,4,4-tetrafluoro-1,3-butadiene which comprises reacting acetylene with tetrafluoroethylene at a temperature within the range 350° C.–900° C., and isolating 1,1,4,4-tetrafluoro-1,3-butadiene.

2. Process for the preparation of 1,1,4,4-tetrafluoro-1,3-butadiene which comprises reacting tetrafluoroethylene with at least an equimolar proportion of acetylene at a temperature within the range 350° C.–900° C., and isolating 1,1,4,4-tetrafluoro-1,3-butadiene.

3. Process for the preparation of 1,1,4,4-tetrafluoro-1,3-butadiene which comprises reacting tetrafluoroethylene with at least an equimolar proportion of acetylene at a temperature within the range 550° C.–700° C., and isolating 1,1,4,4-tetrafluoro-1,3-butadiene.

4. Process for the preparation of 1,1,4,4-tetrafluoro-1,3-butadiene which comprises reacting tetrafluoroethylene with a molar excess of acetylene at a temperature within the range 550° C.–700° C., and isolating 1,1,4,4-tetrafluoro-1,3-butadiene.

5. Process for the preparation of 1,1,4,4-tetrafluoro-1,3-butadiene which comprises reacting tetrafluoroethylene with a molar excess of acetylene for one to thirty seconds at a temperature within the range 550° C.–700° C., rapidly cooling the reaction gases, and isolating 1,1,4,4-tetrafluoro-1,3-butadiene.

References Cited in the file of this patent
UNITED STATES PATENTS 2,462,345    Barrick ------------------ Feb. 22, 1949